United States Patent [19]
Shinohara

[11] Patent Number: 5,277,100
[45] Date of Patent: Jan. 11, 1994

[54] TANDEM TYPE VACUUM BOOSTER

[75] Inventor: Takayoshi Shinohara, Nagano, Japan

[73] Assignee: Nissin Kogyo Kabushiki Kaisha, Ueda, Japan

[21] Appl. No.: 966,578

[22] Filed: Oct. 26, 1992

Related U.S. Application Data

[63] Continuation of Ser. No. 730,727, Aug. 16, 1991, abandoned.

[30] Foreign Application Priority Data

Aug. 9, 1990 [JP] Japan .............................. 2-84282[U]

[51] Int. Cl.$^5$ .............................................. F15B 9/10
[52] U.S. Cl. ........................................ 91/376; 91/533; 92/48; 92/99
[58] Field of Search ................ 91/369.1, 369.2, 369.3, 91/376 R; 533; 534; 92/48, 49, 97, 98 R; 99; 101

[56] References Cited

U.S. PATENT DOCUMENTS

| | | | |
|---|---|---|---|
| 3,517,588 | 6/1970 | Kytta | 91/376 R |
| 3,996,915 | 12/1976 | Demetrescu | 123/32 |
| 4,512,237 | 4/1985 | Endoh et al. | 91/376 R |
| 4,587,884 | 5/1986 | Tsubouchi | 92/97 |
| 4,619,185 | 10/1986 | Mori et al. | 91/369.3 |
| 4,716,814 | 1/1988 | Yamakoshi | 91/376 R |
| 4,718,328 | 1/1988 | Mori et al. | 91/376 R |
| 4,813,337 | 3/1989 | Endo | 92/48 |
| 4,905,573 | 3/1990 | Miyazaki et al. | 92/48 |
| 4,955,339 | 9/1990 | Sasaki et al. | 123/295 |
| 4,987,824 | 1/1991 | Shinohara et al. | 92/48 |

FOREIGN PATENT DOCUMENTS

| | | |
|---|---|---|
| 2424514 | 12/1975 | Fed. Rep. of Germany . |
| 51-1816 | 1/1976 | Japan . |
| 63-154816A | 6/1988 | Japan . |
| 1-187312A | 7/1989 | Japan . |
| 2-191819A | 7/1990 | Japan . |
| 2135002A | 8/1984 | United Kingdom . |

Primary Examiner—Edward K. Look
Assistant Examiner—Hoang Nguyen
Attorney, Agent, or Firm—Armstrong, Westerman, Hattori, McLeland & Naughton

[57] ABSTRACT

In a tandem type vacuum booster, the inner peripheral end of a front booster piston and the inner peripheral bead of a front diaphragm are clamped between a front end of a sleeve fitted over the outer periphery of a piston boss and a flange provided on the piston boss and are thereby fixed to a front portion of the piston boss, while the inner peripheral end of a rear booster piston and the inner peripheral bead of a rear diaphragm are clamped between a stopper member mounted on the piston boss and a rear end of the sleeve and are thereby fixed to a rear portion of the piston boss. A first port for communicating the front and rear working chambers with the control valve, and a second port for communicating the front and rear vacuum chambers with the control valve extend through both the piston boss and the sleeve, and communication between both the ports is inhibited by a single annular sealing member mounted at an axially intermediate portion of a junction surface between the piston boss and the sleeve. A portion of the second port leading to the rear vacuum chamber extends along a front surface of the rear booster piston.

5 Claims, 4 Drawing Sheets

TANDEM TYPE VACUUM BOOSTER

This application is a continuation of application Ser. No. 07/730,727 filed Aug. 16, 1991, now abandoned.

BACKGROUND OF THE INVENTION

1. Field of the Invention

The field of the present invention is tandem type vacuum boosters of a type including a booster shell having a partition plate fixedly mounted therein for partitioning an interior of the booster shell into a front shell chamber and a rear shell chamber, a front booster piston provided to divide the front shell chamber into a fore-side front vacuum chamber and a back-side front working chamber, a front diaphragm superposed on a rear surface of the front booster piston, a rear booster piston provided to divide the rear shell chamber into a fore-side rear vacuum chamber and a back-side rear working chamber, a rear diaphragm superposed on a rear surface of the rear booster piston, the front booster piston and the front diaphragm being joined to the rear booster piston and the rear diaphragm through a piston boss which extends through the partition plate and leads to an output rod, a valve cylinder continuously formed with a rear end of the piston boss and slidably supported on a rear wall of the booster shell, an input rod for advancing and retreating movements, and a control valve for placing the two working chambers into alternate communication with the atmosphere and the two vacuum chambers in response to the advancing and retreating movements of the input rod, the input rod and the control valve being disposed within the valve cylinder.

2. Description of the Prior Art

Such a tandem type vacuum booster has already been proposed by the present assignee and is known, for example, from U.S. Pat. No. 4,905,573.

In the above tandem type vacuum booster, in order to connect the front and rear booster pistons and the front and rear diaphragms to the piston boss, three components: the piston boss, an end plate of a cylindrical connecting member connected to the front booster piston and superposed on a front end of the piston boss, and a retaining plate superposed on a rear end of the piston boss are coupled to one another by a plurality of through bolts, thereby fixing the front booster piston and the front diaphragm between the end plate and the front end of the piston boss and fixing the rear booster piston and the rear diaphragm between the retaining plate and the rear end of the piston boss.

In the above prior art tandem type vacuum booster, however, there is a problem that it is necessary to pass the plurality of through-bolts through the piston boss, the end plate and the retaining plate and tighten them. This results not only in an increased number of parts but also in necessitating much labor and time for assembling the parts.

SUMMARY OF THE INVENTION

Accordingly, it is an object of the present invention to provide a tandem type vacuum booster wherein an operation of coupling the front and rear booster pistons and the front and rear diaphragms to the piston boss can be readily conducted.

To achieve the above object, according to the present invention, there is provided a tandem type vacuum booster comprising a booster shell having a partition plate fixedly mounted therein for partitioning an interior of the booster shell into a front shell chamber and a rear shell chamber; a front booster piston provided to divide the front shell chamber into a fore-side front vacuum chamber and a back-side front working chamber; a front diaphragm superposed on a rear surface of the front booster piston; a rear booster piston provided to divide the rear shell chamber into a fore-side rear vacuum chamber and a back-side rear working chamber; a rear diaphragm superposed on a rear surface of the rear booster piston; the front booster piston and the front diaphragm being joined to the rear booster piston and the rear diaphragm through a piston boss which extends through the partition plate and leads to an output rod; a valve cylinder continuously formed with a rear end of the piston boss and slidably supported on a rear wall of the booster shell; an input rod for advancing and retreating movements; and a control valve for placing both the working chambers into alternate communication with the atmosphere and both the vacuum chambers in response to advancing and retreating movements of the input rod, the input rod and the control valve being disposed within the valve cylinder, wherein the booster further includes a sleeve slidably supported on the partition plate and fitted over an outer periphery of the piston boss, an inner peripheral end of the front booster piston and an inner peripheral bead of the front diaphragm being clamped between a front end of the sleeve and a flange provided on the piston boss and being thereby fixed to a front portion of the piston boss, and an inner peripheral end of the rear booster piston and an inner peripheral bead of the rear diaphragm being clamped between a stopper member mounted on the piston boss and a rear end of the sleeve and being thereby fixed to a rear portion of the piston boss.

With the above construction, only two members: the sleeve fitted over the piston boss and the stopper member mounted on the piston boss may be required for fixing the inner peripheral ends of the front and rear booster pistons and the inner peripheral beads of the front and rear diaphragms to the piston boss, and therefore, it is possible to reduce the number of parts and substantially shorten the time required for assembling them, as compared with the prior art using a plurality of through bolts.

According to a second aspect of the present invention, there is provided a tandem type vacuum booster further including a first port for communicating the front and rear working chambers with the control valve, a second port for communicating the front and rear vacuum chambers with the control valve, the first and second ports being formed to extend between both the piston boss and the sleeve, and a single annular sealing member mounted at an axially intermediate portion of a junction surface between the piston boss and the sleeve, the first and second ports passing through the junction at respective positions in front and rear of the annular sealing member.

With this construction, not only each of the ports can be made easily by utilizing the junction surface between the piston boss and the sleeve, but also communication between both the ports is reliably inhibited by means of the single annular sealing member.

Further, according to a third aspect of the present invention, there is provided a tandem type vacuum booster wherein a port is provided for communicating the front and rear vacuum chambers with the control valve, and the port is comprised of a first passage axially extended through the piston boss to communicate with the front vacuum chamber, and a second passage diverged radially outwardly from an intermediate portion of the first passage to communicate with the rear vacuum chamber, the second passage having an opening which is extended along a front surface of the rear booster piston and opens to the rear vacuum chamber.

With this construction, it is possible, in the advancing movement of the piston boss on the partition plate, to insure a sufficiently large advancing stroke of the piston boss until the opening of the second passage communicating with the rear vacuum chamber reaches a location corresponding to the partition plate. Consequently, it is possible to shorten the axial dimension of the rear vacuum chamber to a minimal level substantially equal to the stroke of the piston boss to contribute to a reduction in size of the tandem type vacuum booster.

The above and other objects, features and advantages of the invention will become apparent from the following description of the preferred embodiment, taken in conjunction with the accompanying drawings.

DESCRIPTION OF THE PREFERRED EMBODIMENT

The present invention will now be described by way of one embodiment in connection with the accompanying drawings.

Figure 1:
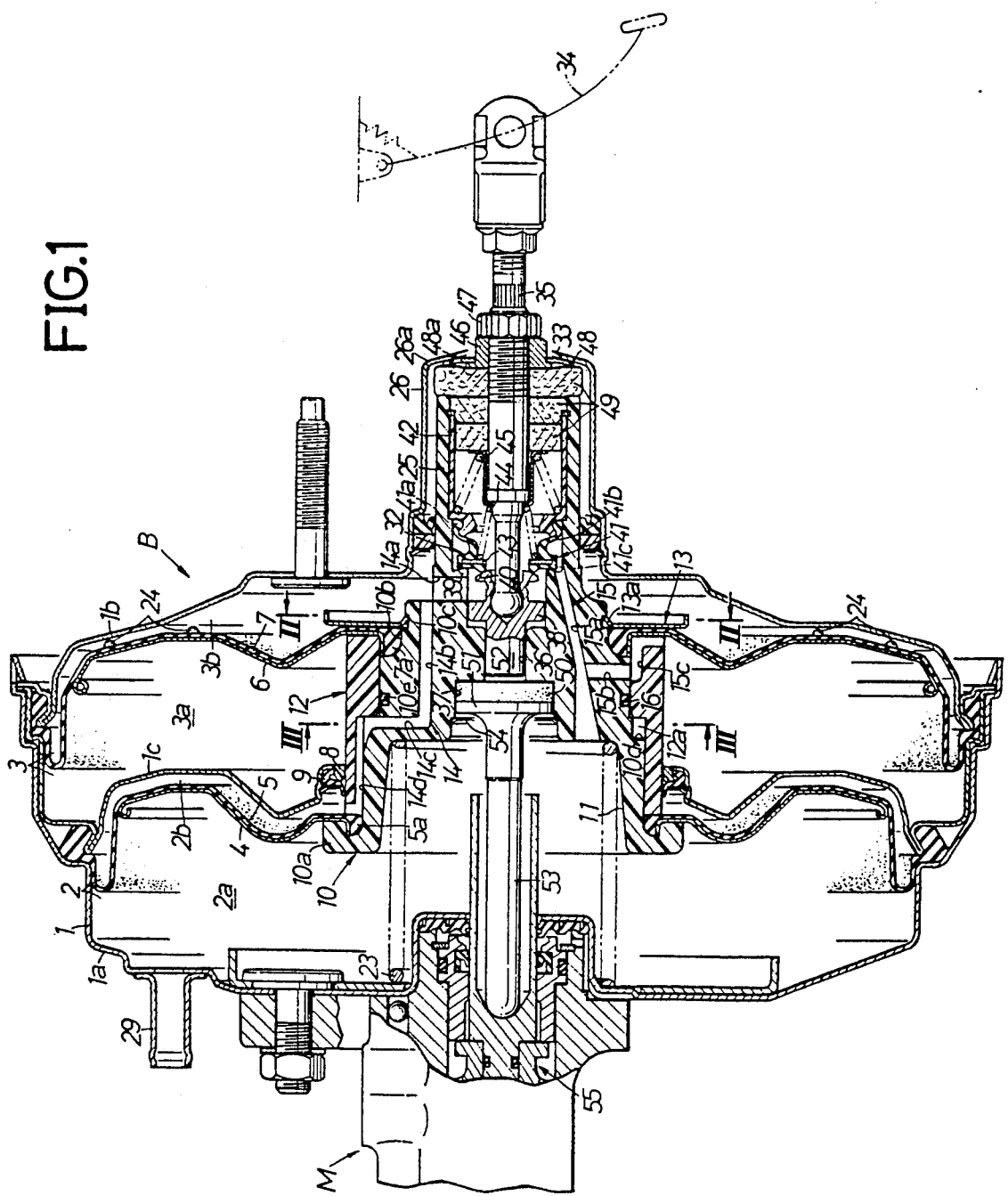
FIG. 1 is a longitudinal sectional view illustrating a tandem type vacuum booster in a rest condition.

Referring to FIG. 1, a brake master cylinder M which is operated by a tandem type vacuum booster B is attached to a front surface of a booster shell 1 of the vacuum booster B.

The booster shell 1 is comprised of a pair of front and rear shell halves 1a and 1b coupled at opposed ends thereof to each other, and a partition plate 1c clamped between both the shell halves 1a and 1b to partition the inside of the booster shell 1 into a front shell chamber 2 and a rear shell chamber 3. The rear shell half 1b is supported to a vehicle body which is not shown.

The front shell chamber 2 is divided into a fore-side front vacuum chamber 2a and a back-side front working chamber 2b by a front booster piston 4 received in the front shell chamber 2 for longitudinally reciprocal movement and by a front diaphragm 5 superposed on and coupled to a rear surface of the front booster piston 4 and clamped between the front shell half 1a and the partition plate 1c. The rear shell chamber 3 is divided into a fore-side rear vacuum chamber 3a and a back-side rear working chamber 3b by a rear booster piston 6 received in the rear shell chamber 3 for longitudinally reciprocal movement and by a rear diaphragm 7 superposed on and coupled to a rear surface of the rear booster piston 6 and secured together with the partition plate 1c between both the shell halves 1a and 1b.

The front and rear booster pistons 4 and 6 each formed annularly from a steel sheet are coupled to front and rear ends of a piston boss 10 made of synthetic resin, respectively, and a sleeve 12 is fitted over an outer periphery of the piston boss 10 to lie between both the booster pistons 4 and 6 and is slidably carried in the partition plate 1c with a bush 8 and a sealing member 9 interposed therebetween.

More specifically, the piston boss 10 is provided at its front end portion with a circular recess 11 having a depth of substantially one half the axial length of the boss 10, and with a flange 10a projecting from a peripheral edge of an opening of the circular recess 11. An inner peripheral end of the front booster piston 4 and an inner peripheral bead 5a of the front diaphragm 5 are engaged, in a superposed relation, with the flange 10a, and the cylindrical sleeve 12 is placed over the outer periphery of the piston boss 10 forwardly from the rear side, so as to urge its front end against a rear surface of the inner peripheral bead 5a. This causes the front booster piston 4 and the front diaphragm 5 to be clamped between the flange 10a and the sleeve 12 and thereby secured firmly to a front portion of the piston boss 10. An inner peripheral end of the rear booster piston 6 and an inner peripheral bead 7a of the rear diaphragm 7 are engaged, in a superposed relation, with a step 10b formed on the piston boss 10 inside a rear end of the sleeve 12, and the inner peripheral bead 7a is retained at its rear surface by a set ring 13 as a stopper member. More specifically, the set ring 13 is mounted over the piston boss 10 by engagement of a large number of pawls 13 projecting from an inner periphery of the set ring 13 into an annular groove 10c connected to a rear portion of the step 10b, so that the rear booster piston 6 and the rear diaphragm 7 are secured firmly to a rear portion of the piston boss 10 by the set ring 13, and the axial movement of the sleeve 12 fitted over the piston boss 10 is restrained by the set ring 13.

Figure 2:
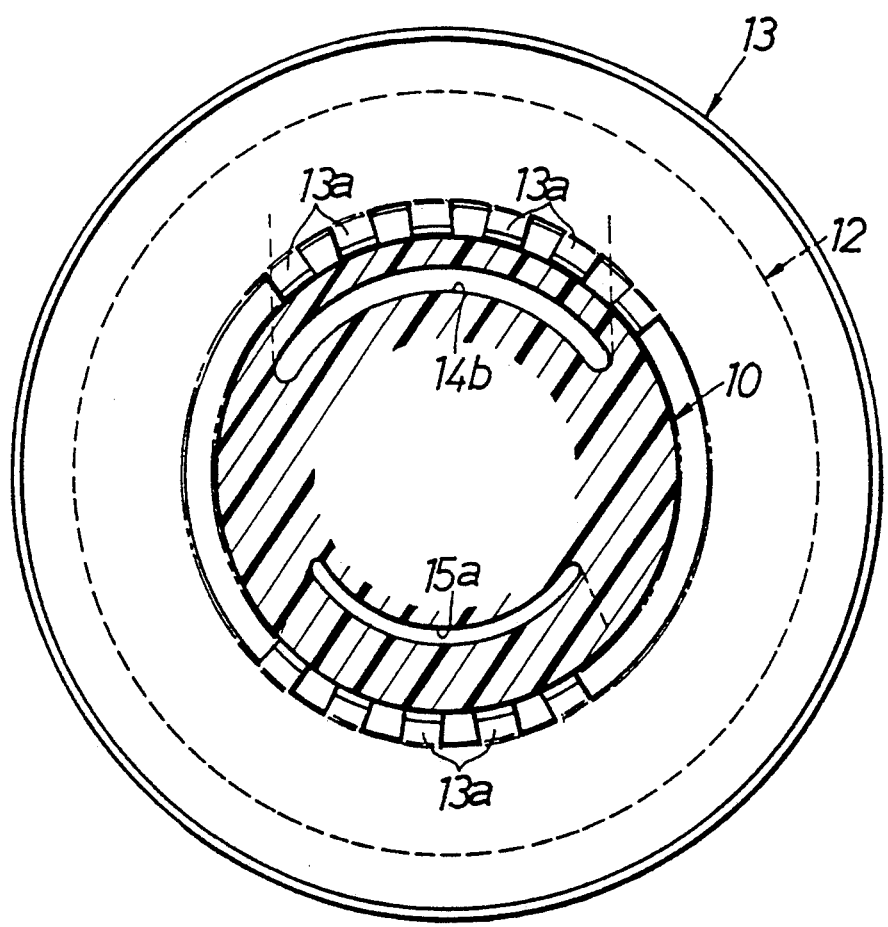
FIGS. 2 and 3 are sectional views taken along lines II—II and III—III in FIG. 1, respectively.
Figure 3:
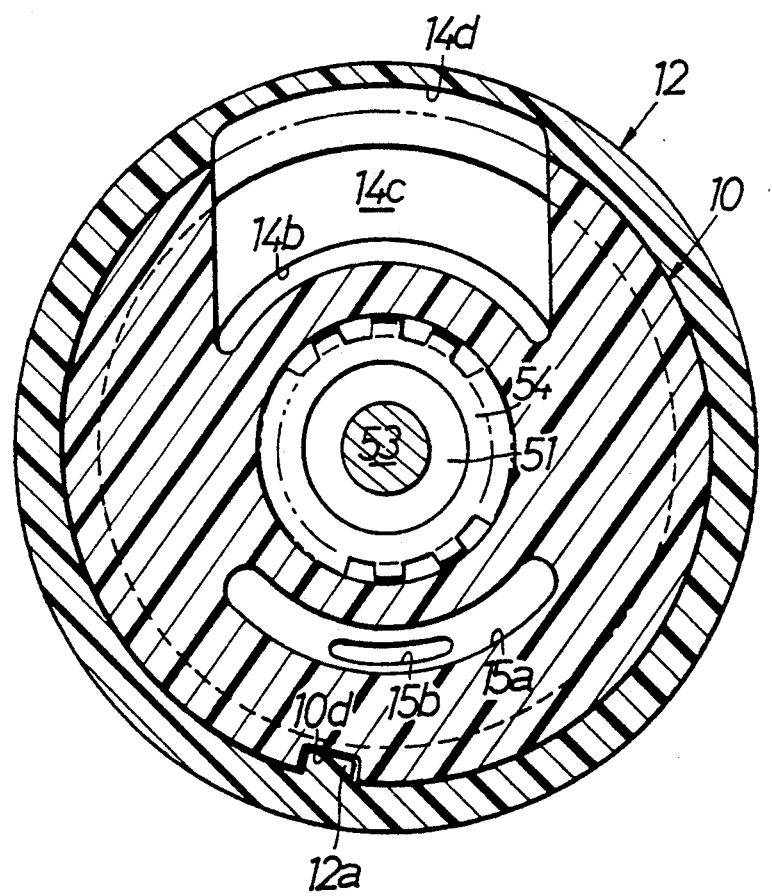

A first port 14 is formed in the piston boss 10 to communicate the front and rear working chambers 2b and 3b with the atmosphere through a control valve 32 which will be described hereinafter. As can be seen by reference to FIGS. 2 and 3 in addition to FIG. 1, the first port 14 is comprised of a passage 14a extending radially through the rear end of the piston boss 10 to permit a communication between the rear working chamber 3b and the control valve 32, a passage 14b having an arcuate section and made axially in the piston boss 10, a passage 14c extending radially outwardly from a front end of the passage 14b, and a passage 14d defined by a groove provided in an inner surface of the sleeve 12 and by the outer periphery of the piston boss 10 to communicate with the front working chamber 2b. A second port 15 is provided for communicating the front and rear working chambers 2b and 3b with the front and rear vacuum chambers 2a and 3a through the first port 14 and the control valve 32 and is comprised of a passage 15a having an arcuate section and passing axially through the piston boss 10 to connect the control valve 32 with the front vacuum chamber 2a, a passage 15b extending radially outwardly from the passage 15a, and a passage 15c defined by a groove provided in the inner surface and rear end of the sleeve 12 with the front surface of the rear booster piston 6 to permit communication between the passage 15b and the rear vacuum chamber 3a. A recess 10d provided on the outer periphery of the piston boss 10 and a projection 12a formed on the inner periphery of the sleeve 12 are engaged with each other (see FIG.3) in order to provide an alignment of the passages 14c and 15b provided in the piston boss 10 and the passages 14d and 15b provided in the piston boss 10 and the passages 14d and 15c provided in the sleeve 12. Contact surfaces of the outer periphery of the piston boss 10 and the inner periphery of the sleeve 12 are sealed by an O-ring 16 mounted in a seal groove 10e provided on the outer periphery of the piston boss 10. Thus, the first port 14 communicating with the front working chamber 2b is prevented from communicating with the front and rear vacuum chambers 2a and 3a by the inner peripheral bead 5a of the front diaphragm 5 and O-ring 16, the second port 15 communicating with both the vacuum chambers 2a and 3a is prevented from communicating with the rear and front working chambers 3b and 2b by the inner peripheral bead 7a of the rear diaphragm 7 and O-ring 16.

A return spring 23 is mounted in a compressed manner between the circular recess 11 provided at the front end of the piston boss 10 and the front shell half 1a, so that the piston boss 10 and thus both the booster pistons 4 and 6 are biased in the retreating direction at all times by a spring force of the return spring 23. A retreat limit for the booster pistons 4 and 6 is determined by abutment of a large number of projections 24 raised on the rear surface of the rear diaphragm 6 against a rear wall of the booster shell 1.

The front vacuum chamber 2a is connected to a vacuum pressure source (not shown) (e.g., an inside of an intake manifold in an internal combustion engine) through a vacuum pressure intake pipe 29 and communicates with the rear vacuum chamber 3a via the second port 15 made in the piston boss 10. The front and rear working chambers 2b and 3b communicate with each other via the first port 14 made in the piston boss 10 and are capable of alternatively communicating with the respective front and rear vacuum chambers 2a and 3a or an atmospheric air intake port 33 opened at an end wall 26a of a rearwardly extended cylindrical member 26 connected to the rear end of the booster shell 1.

An input rod 35 connected to a brake pedal 34 and the control valve 32 controlled by the input rod 35 are mounted in the following manner within a valve cylinder 25 connected to the rear portion of the piston boss 10. A valve piston 38 is slidably received in a front portion of the valve cylinder 25, and the input rod 35 extending through the atmospheric air intake port 33 is ocsillatably coupled at its front end to the valve piston 38. A first annular valve seat 39 is provided on an inner peripheral surface of the valve cylinder 25, and a second annular valve seat 40 is formed on a rear end face of the valve piston 38 and surrounded by the first valve seat 39. A valve member 41 is disposed within the valve cylinder 25 and cooperates with the valve seat 39 and 40. The valve member 41 is made of rubber and is cylindrical with opposite front and rear ends opened. The rear or base end 41a of the valve member 41 is kept in close contact with the inner peripheral surface of the valve cylinder 25 by a cylindrical retainer 42 fitted to the inner peripheral surface of the valve cylinder 25. The valve member 41 includes a flexible portion 41b having a small wall thickness and bent radially inwardly from the base end 41a, and a valve portion 41c having a large wall thickness and connected to a front end of the flexible portion. The valve portion 41c is disposed in an opposed relation to the first and second valve seats 39 and 40. The valve portion 41c is movable longitudinally through deformation of the flexible portion 41b, so that it can be seated on the first and second valve seats 39 and 40 upon advancing movement and can be received on a front end of the cylindrical retainer 42 upon retreating movement.

An annular reinforcing plate 43 is embedded in the valve portion 41c, and a valve spring 44 is mounted in a compressed manner between the reinforcing plate 43 and the input rod 35 for biasing the valve portion 41c toward both the valve seats 39 and 40. One end of the second port 15 is opened to the inner surface of the valve cylinder 25 at a position outside the first valve seat 39, and one end of the first port 14 is opened to the inner surface of the valve cylinder 25 at a position inside the first valve seat 39. A space inside the second seat 40 communicates with the atmospheric air intake port 33 via the hollow interiors of the valve member 41 and the cylindrical retainer 42. Thus, the control valve 32 is comprised of the valve member 41, the valve spring 44, and the first and second valve seats 39 and 40.

A return spring 45 is mounted in a compressed manner between the input rod 35 and the cylindrical retainer 42 for biasing the input rod 35 toward its retreat limit. The retreat limit of the input rod 35 is provided by abutment of a stopper plate 46, screwed over the input rod 35 in a manner adjustable in advancing and retreating directions, against the inner surface of the rear end 26a of the cylindrical rearwardly-extended member 26 through a washer 48. Therefore, if the stopper 46 is turned, the screwed position of the stopper plate 46 on the input rod 35 is changed and hence, the retreat limit of the input rod 35 can be adjusted longitudinally. The fixing of the stopper plate 46 after such adjustment may be achieved by tightening a lock nut 47 screwed on the input rod 35. A communication hole 48a is provided in the washer 48, so that the atmospheric air intake port 33 is prevented from being occluded by the washer 48.

An air filter 49 is mounted to surround the input rod 35 for filtering air introduced from the outside through the atmospheric air intake port 33 into the valve cylinder 25. The air filter 49 has a moderate softness, so as not to hinder the relative displacement between the input rod 35 and the valve cylinder 25.

The piston boss 10 is provided with a larger diameter cylinder bore 37 opened at a central portion of the front surface thereof, and a smaller diameter cylinder bore 36 opened at its opposite ends into the larger diameter cylinder bore 37 and the valve cylinder 25. A reaction piston 52, which may be provided either integrally with or separately from and abut against the valve piston 38, is slidably received in the smaller diameter cylinder bore 36. A resilient piston 50 and an output piston 51 superposed on a front surface of the resilient piston 50 are slidably received in the larger diameter cylinder bore 37. In order to prevent the output piston 51 from slipping out of the larger diameter cylinder bore 37, a set ring 54 is mounted at an opening of the larger diameter cylinder bore 37.

An output rod 53 is provided projectingly on a front surface of the output piston 51 and connected to a piston 55 of the brake master cylinder M.

The operation of this embodiment will be described below. First, when the vacuum booster B is out of operation, as shown in FIG. 1 the input rod 35 is located at the retreat limit, and the control valve 32 is in a neutral state in which the valve portion 41c is seated on the first and second valve seats 39 and 40. Thereby both the front and rear working chambers 2b and 3b are out of communication with either the vacuum chambers 2a and 3a and the atmospheric air intake port 33. The control valve 32 in this state ensures that a vacuum pressure supplied from the vacuum pressure source through the vacuum pressure intake pipe 29 is stored in both the vacuum chambers 2a and 3a, and a vacuum pressure diluted properly with the atmospheric air is maintained in both the working chambers 2b and 3b. Thus, a slight advancing for is applied to each of the front and rear booster pistons 4 and 6 due to a difference in air pressure developed between the front vacuum chamber 2a and the working chamber 2b and between the rear vacuum chamber 3a and the working chamber 3b. Such advancing forces are however, balanced with the resilient force of the return spring 23, so that the booster pistons 4 and 6 are stopped at locations where they have advanced slightly from their retreat limits.

Figure 4:
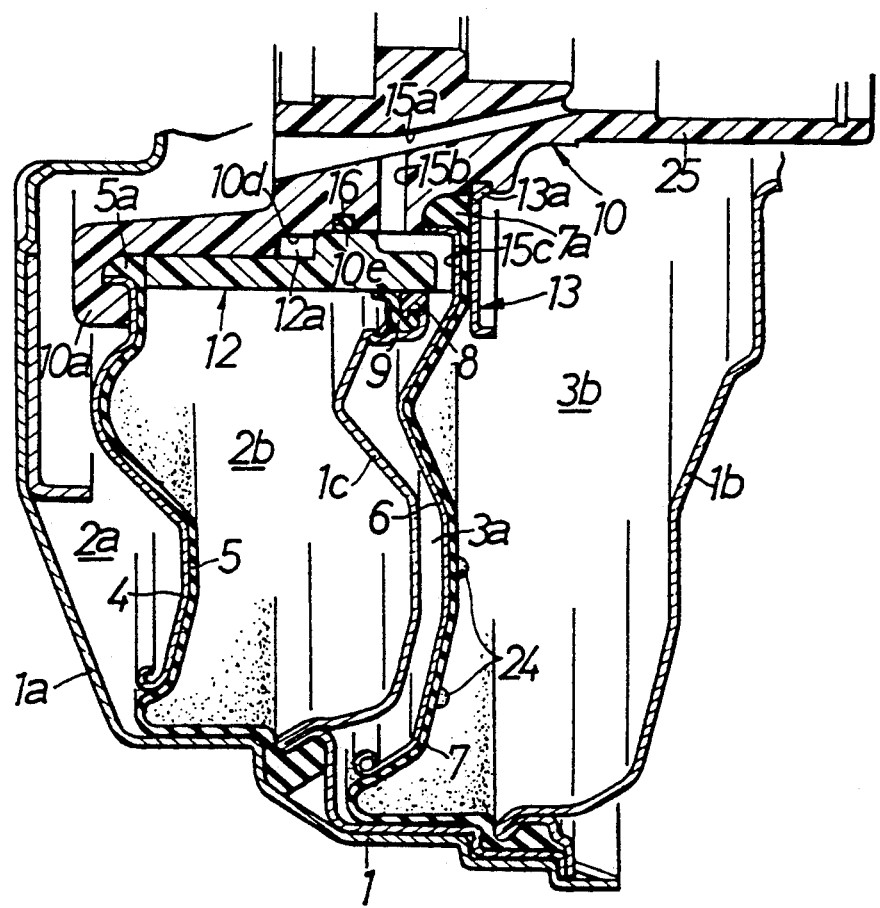
FIG. 4 is a longitudinal sectional view illustrating a part of the tandem type vacuum booster in operation.

If the brake pedal 34 is now depressed to advance the input rod 35 and the piston 38 in order to brake the vehicle, the second valve seat 40 is immediately separated away from the valve portion 41c to put both the working chambers 2b and 3b into communication with the atmospheric air intake port 33, because both the booster pistons 4 and 6 are stationary at the beginning. As a result, the atmospheric air is introduced quickly through the atmospheric air intake port 33 via the second valve seat 40 and the first port 14 into both the working chambers 2b and 3b, so that the pressure in the chambers 2b and 3b rises to a level higher than that in the vacuum chambers 2a and 3a. Therefore, as shown in FIG. 4, the booster pistons 4 and 6 get a large advancing force based on a difference between the air pressure and advance with a good response against the force of the return spring 23, thereby driving the piston 55 of the brake master cylinder M forwardly through the output rod 53. In this manner, the brake master cylinder M can be operated without any retard in response to the depression of the brake pedal 34 to brake the vehicle. During this time, the passage 15c of the second port 15 made in the sleeve 12 is open to the rear end of the rear vacuum chamber 3a and hence, it is possible to insure a sufficient stroke of the piston boss 10 and thus of the piston 55.

During such a braking, the valve piston 38 is also advanced together with the input rod 35 to abut against the resilient piston 50 via the reaction piston 52 interposed therebetween. However, the resilient piston 50 is deformed to expand toward the smaller diameter cylinder bore 36 upon reception of a reaction force due to the operation of the booster pistons 4 and 6, thereby applying such reaction force partly to the reaction piston 52. This reaction is then fed back to the brake pedal 34 through the valve piston 38 and the input rod 35. Such a reaction effect enables the driver to sense the magnitude of an output from the output rod 53, i.e., a braking force.

If the output from the output rod 53 exceeds a boosting limit point due to an increase in the depression force to the brake pedal 34, i.e., in the input to the input rod 35, a front surface of the valve piston 38 abuts against the piston boss 10, so that the entire input is transmitted via the valve piston 38, the piston boss 10, the resilient piston 50 and the output piston 51 to the output rod 53. Consequently a sum of the advancing force of each of the booster pistons 4 and 6 due to a difference in air pressure and the advancing force due to the input is output from the output rod 53.

If the depression force to the brake pedal 34 is then released, the input rod 35 is first retreated along with the valve piston 38 by the resilient force of the return spring 45. Thereby the second valve seat 40 is seated on the valve portion 41c of the valve member 41, while the valve portion 41c is separated greatly away from the first valve seat 39, so that both the working chambers 2b and 3b are put into communication with the vacuum chambers 2a and 3a to immediately eliminate the difference in air pressure across each of the booster piston 4 and 6. Thus, the booster pistons 4 and 6 are retreated by the resilient force of the return spring 23 to release the operation of the brake master cylinder M. If the input rod 35 is returned to its retreat limit at which the stopper plate 46 abuts against the end wall 26a of the cylindrical extension 26, the rear booster piston 6 is once returned to its retreat limit at which the projections 24 abut against the rear wall of the booster shell 1. Thereby the first valve seat 39 is seated on the valve portion 41c, while the valve portion 41c is separated slightly away from the second valve seat 40, so that the atmospheric air is introduced again into both the working chambers 2b and 3b. If both the booster pistons 4 and 6 are advanced slightly due to a difference in air pressure developed thereby, however, a small gap between the second valve seat 40 and the valve portion 41c is eliminated to bring the control valve 32 into the initial neutral state. In this manner, the vacuum pressure diluted with the atmospheric air is maintained in both the working chambers 2b and 3b, and the vacuum booster B is brought into an inoperative state as shown in FIG. 1.

In such tandem type vacuum booster B, when fixing the front and rear booster pistons 4 and 6 and the front and rear diaphragms 5 and 7 to the piston boss 10, the inner peripheral end of the front booster piston 4 and the inner peripheral bead 5a of the front diaphragm 5 are first fitted to the flange 10a of the piston 10 from the rearward. Then, the front booster piston 4 and the diaphragm 5 are clamped and fixed between the flange 10a and the front end of the sleeve 12 fitted from the rearward. At this time, any relative rotation between the sleeve 12 and the piston boss 10 is restrained by engagement of the projection 12a formed on the sleeve 12 into the recess 10d made in the piston boss 10. In addition, the sealing member 9 mounted on the partition plate 1c is bent forwardly, i.e., toward the inside of the front working chamber 2b by the front end of the sleeve 12 fitted from the rearward, thus effectively preventing any leakage of pressure from the higher pressure front working chamber 2b into the lower pressure rear vacuum chamber 3a. Then, the inner peripheral end of the rear booster piston 6 and the inner peripheral bead 7a of the rear diaphragm 7 are set to the step 10b of the piston boss 10 from the rearward. The set ring 13 is then mounted to the rear portion thereof. This causes the rear booster piston 6 and the rear diaphragm 7 to be clamped and fixed between the rear end of the sleeve 12 and the set ring 13.

With the sleeve 12 fixed to the piston boss 10 in the above manner, the first port 14 is defined by cooperation of the piston boss 10 and the sleeve 12, and the second port 15 is defined by cooperation of the piston boss 10, sleeve 12 and rear booster piston 6. Communication of the first port 14 with the front and rear vacuum chambers 2a and 3a is inhibited by the O-ring 16 in a surface and between the outer periphery of the piston boss 10 and the inner periphery of the sleeve 12 and by the inner peripheral bead 5a of the front diaphragm 5. At the same time, communication of the second port 15 with the front and rear working chambers 2b and 3b is inhibited by the O-ring 16 and the inner peripheral bead 7a of the rear diaphragm 7.

What is claimed is:

1. A tandem type vacuum booster, comprising:

a booster shell having an interior thereof divided by partition means into a front shell chamber and a rear shell chamber;

a front booster piston provided to divide the front shell chamber into a fore-side front vacuum chamber and a back-side front working chamber;

a front diaphragm superposed on a rear surface of the front booster piston;

a rear booster piston provided to divide the rear shell chamber into a fore-side rear vacuum chamber and a back-side rear working chamber;

a rear diaphragm superposed on a rear surface of the rear booster piston;

a piston boss extending through the partition means and operatively connected with an output rod;

a valve cylinder continuously formed at a rear of the piston boss and slidably supported on a rear wall of the booster shell;

an input rod for advancing and retreating movements;

valve means for controlling selective communication of said front and rear working chambers with the atmosphere and with said front and rear vacuum chambers via ports in response to the movements of the input rod; and a sleeve slidably supported on the partition means and fitted over an outer periphery of the piston boss;

wherein an inner peripheral end of the front booster piston and an inner peripheral bead of the front diaphragm are clamped between a front end of the sleeve and a radial flange integrally provided at a front portion of the piston boss, while an inner peripheral end of the rear booster piston and an inner peripheral bead of the rear diaphragm are received in a rearwardly opening recess defined at a junction surface between the sleeve and the outer periphery of the piston boss at the rear end of the sleeve so as to be radially held in the recess by the sleeve and the piston boss with use of a separate stopper member fixed on the outer periphery of the piston boss, the whole outer periphery of the recess being formed by the sleeve, and wherein a seal member is disposed at said junction surface and said ports include a first port for connecting the working chambers with the control valve means and a second port for connecting the vacuum chambers with the control valve means, said first and second ports passing across the junction surface at locations axially distanced from the seal member in directions opposite to each other.

2. A tandem type vacuum booster, comprising:

a booster shell having a partition plate fixedly mounted therein for partitioning an interior of the booster shell into a front shell chamber and a rear shell chamber;

a front booster piston provided to divide the front shell chamber into a fore-side front vacuum chamber and a back-side front working chamber;

a front diaphragm superposed on a rear surface of the front booster piston;

a rear booster piston provided to divide the rear shell chamber into a fore-side rear vacuum chamber and a back-side rear working chamber;

a rear diaphragm superposed on a rear surface of the rear booster piston;

said front booster piston and said front diaphragm being joined to said rear booster piston and said rear diaphragm through a piston boss which extends through said partition plate and leads to an output rod;

a valve cylinder continuously formed with a rear end of said piston boss and slidably supported on a rear wall of said booster shell;

an input rod for advancing and retreating movements; and a control valve for placing both said working chambers into alternate communication with the atmosphere and both said vacuum chambers in response to advancing and retreating movements of said input rod, said input rod and said control valve being disposed within said valve cylinder, wherein said booster further includes a sleeve slidably supported on said partition plate and fitted over an outer periphery of said piston boss, an inner peripheral end of said front booster piston and an inner peripheral bead of said front diaphragm being clamped between a front end of said sleeve and a flange provided integrally on said piston boss and being thereby fixed to a front portion of said piston boss, an inner peripheral end of said rear booster piston and an inner peripheral bead of said rear diaphragm being clamped between a stopper member mounted on said piston boss and a rear end of said sleeve and being thereby fixed to a rear portion of said piston boss, a first port communicating said front and rear working chambers with the control valve, a second port communicating said front and rear vacuum chambers with the control valve, both of said first and second ports being formed to extend over both said piston boss and said sleeve, and a single annular sealing member mounted at an axially intermediate portion of a junction surface between said piston boss and said sleeve, said first and second ports passing across said junction surface at respective positions in front and rear of the annular sealing member, and further wherein said stopper member is formed separately from the piston boss and a recess open to a rear of the booster is provided at the junction surface, a radially outer peripheral portion of the recess being wholly formed by said sleeve, said inner peripheral end of said rear booster piston and said inner peripheral bead of said rear diaphragm being received in said recess and held radially by the sleeve and the piston boss, and means for holding said stopper member against the rear surface of the rear diaphragm and fixing said inner peripheral end of said rear booster piston and said inner peripheral bead of said rear diaphragm in said recess.

3. A tandem type vacuum booster according to claim 2, wherein said second port communicating said front and rear vacuum chambers with the control valve is comprised of a first passage axially extended through said piston boss to communicate with said front vacuum chamber, and a second passage diverged radially outwardly from an intermediate portion of said first passage to communicate with said rear vacuum chamber, the second passage having an opening which is extended along a front surface of said rear booster piston and opens to the rear vacuum chamber.

4. A tandem type vacuum booster according to claim 2, wherein said stopper member is formed separately from the piston boss and a recess open to a rear of the booster is provided at the junction surface, said inner peripheral end of said rear booster piston and said inner peripheral bead of said rear diaphragm being received in said recess, and means for holding said stopper member against the rear surface of the rear diaphragm and fixing said inner peripheral end of said rear booster piston and said inner peripheral bead of said rear diaphragm in said recess.

5. A tandem type vacuum booster according to claim 2, wherein said second port passes, across the junction surface in front of said recess.

* * * * *

UNITED STATES PATENT AND TRADEMARK OFFICE
CERTIFICATE OF CORRECTION

PATENT NO.   :  5,277,100
DATED        :  Jan. 11, 1994
INVENTOR(S)  :  Takayoshi Shinohara It is certified that error appears in the above-indentified patent and that said Letters Patent is hereby corrected as shown below:

On the cover page, Item [63], "Continuation of Ser. No. 730,727, Aug. 16, 1991, abandoned." should read --Continuation of Ser. No. 730,727, July 16, 1991, abandoned.--.

Signed and Sealed this

Fifth Day of July, 1994

Attest:

BRUCE LEHMAN

*Attesting Officer*     *Commissioner of Patents and Trademarks*